United States Patent
Heyl

(10) Patent No.: US 11,619,942 B2
(45) Date of Patent: Apr. 4, 2023

(54) CONTROLLING AN AUTONOMOUS VEHICLE WHEN THE AUTONOMOUS VEHICLE IS OUTSIDE OF ITS OPERATIONAL DESIGN DOMAIN

(71) Applicant: Robert Bosch GmbH, Stuttgart (DE)

(72) Inventor: Andreas Heyl, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 218 days.

(21) Appl. No.: 16/653,434

(22) Filed: Oct. 15, 2019

(65) Prior Publication Data

US 2021/0109528 A1    Apr. 15, 2021

(51) Int. Cl.
  *G05D 1/02* (2020.01)
  *G05D 1/00* (2006.01)

(52) U.S. Cl.
  CPC ......... *G05D 1/0212* (2013.01); *G05D 1/0055* (2013.01); *G05D 1/0231* (2013.01); *G05D 1/0276* (2013.01); *G05D 2201/0213* (2013.01)

(58) Field of Classification Search
  CPC ............... G05D 1/0212; G05D 1/0055; G05D 1/0231; G05D 1/0276; G05D 2201/0213
  See application file for complete search history.

(56) References Cited

U.S. PATENT DOCUMENTS

| 10,152,892 | B2 | 12/2018 | Matthiesen et al. | |
| 2005/0102089 | A1* | 5/2005 | Linden | G01S 13/723 701/96 |
| 2015/0153733 | A1* | 6/2015 | Ohmura | G05D 1/0061 701/23 |
| 2015/0254978 | A1* | 9/2015 | Mawbey | B60Q 1/52 340/902 |
| 2016/0267795 | A1* | 9/2016 | Miyazawa | B60W 30/12 |
| 2018/0290652 | A1 | 10/2018 | Kindo | |
| 2018/0336782 | A1 | 11/2018 | Chase et al. | |
| 2019/0015976 | A1 | 1/2019 | Sweeny et al. | |
| 2019/0113925 | A1 | 4/2019 | Sim | |
| 2019/0179305 | A1 | 6/2019 | Magzimof et al. | |
| 2019/0196466 | A1 | 6/2019 | Agarwal et al. | |
| 2019/0197497 | A1* | 6/2019 | Abari | G05D 1/0027 |
| 2021/0034060 | A1* | 2/2021 | Patnaik | G08G 1/096725 |
| 2021/0163021 | A1* | 6/2021 | Frazzoli | B60W 50/0205 |

* cited by examiner

*Primary Examiner* — Rami Khatib
*Assistant Examiner* — Shahira Baajour
(74) *Attorney, Agent, or Firm* — Michael Best & Friedrich LLP

(57) ABSTRACT

A system for controlling an autonomous vehicle when the autonomous vehicle is outside of its operational design domain. The system includes an environment detection system, a vehicle control system, and a first electronic processor. The first electronic processor is configured to detect that an autonomous vehicle is outside of its operational design domain and send a first electronic message. The first electronic message requests that a surrounding vehicle lead the autonomous vehicle until the autonomous vehicle returns to its operational design domain or reaches a predetermined location. The electronic processor is also configured to determine a leading vehicle and control the autonomous vehicle to follow the leading vehicle until the autonomous vehicle returns to its operational design domain or reaches the predetermined location.

20 Claims, 7 Drawing Sheets

CONTROLLING AN AUTONOMOUS VEHICLE WHEN THE AUTONOMOUS VEHICLE IS OUTSIDE OF ITS OPERATIONAL DESIGN DOMAIN

FIELD

Embodiments relate to improving the operation of autonomous vehicles, for example, when such vehicles are operating in environments where human-driven vehicles also operate.

BACKGROUND

Modern vehicles include various partially autonomous driving functions, for example adaptive cruise-control, collision avoidance systems, self-parking, and the like. Fully autonomous driving is a goal, but has not yet been achieved, at least on market-ready, commercially-viable scale.

SUMMARY

Autonomous vehicles are limited to operating autonomously within a certain operational design domain (ODD). The ODD is defined by one or more parameters that an electronic processor is trained to operate an autonomous vehicle within with a predetermined level of confidence. Outside of the ODD, the autonomous vehicle cannot be guaranteed to function as desired. Unfortunately, there are situations in which the autonomous vehicle (intendedly or unintendedly) moves outside of its ODD. For example, if environmental conditions change (for example, it becomes foggy or begins snowing) or if the autonomous vehicle faces a traffic situation that the autonomous vehicle has not been trained to function in (for example, a construction zone), the autonomous vehicle may move outside of its ODD.

In some systems, an autonomous vehicle detects that it has left its ODD by analyzing the surrounding environment or receiving information regarding the autonomous vehicle's current position on a route. In one example, the autonomous vehicle may use image recognition techniques to detect barricades and temporary signage and thereby determine that it is entering a construction zone. In another example, the vehicle may receive data, such as weather data, associated with is current position. In some systems, a vehicle detects that it has left its ODD by evaluating parameters associated with the vehicle's ability to perceive its environment. The parameters may be, for example, calculated confidence or uncertainty values.

In existing systems, when an autonomous vehicle determines that it has left its ODD, the autonomous vehicle may stop in an area where it is safe to do so or adapt its behavior by, for example, slowing down until it re-enters its ODD. Whether the autonomous vehicle stops or slows down, the change in the autonomous vehicle's behavior may cause a hazard to surrounding vehicles, because the surrounding vehicles may not anticipate the change in the autonomous vehicle's behavior. For example, the surrounding vehicle's inability to anticipate the autonomous vehicle's behavior may be due to the fact that the behavior of the autonomous vehicle is unexpected from a human driver.

To mitigate the hazard that an autonomous vehicle's changing behavior causes to surrounding vehicles, embodiments herein describe, among other things, a system of alerting one or more vehicles surrounding the autonomous vehicle that the autonomous vehicle is traveling outside of its ODD. In some embodiments, the autonomous vehicle may alert surrounding vehicles that it is outside of its ODD and may behave in an unusual manner. In some embodiments, the autonomous vehicle may send a message to one or more vehicles in its surrounding environment requesting that a surrounding vehicle lead the autonomous vehicle until the autonomous vehicle reenters its ODD.

For example, one embodiment provides a system for controlling an autonomous vehicle when the autonomous vehicle is outside of its operational design domain. The system includes an environment detection system, a vehicle control system, and a first electronic processor. The first electronic processor is configured to detect that an autonomous vehicle is outside of its operational design domain and send a first electronic message. The first electronic message requests that a surrounding vehicle lead the autonomous vehicle until the autonomous vehicle returns to its operational design domain or reaches a predetermined location. The electronic processor is also configured to determine a leading vehicle and control the autonomous vehicle to follow the leading vehicle until the autonomous vehicle returns to its operational design domain or reaches the predetermined location.

Another embodiment provides a method for controlling an autonomous vehicle when the autonomous vehicle is outside of its operational design domain. The method includes detecting, with an electronic processor, that an autonomous vehicle is outside of its operational design domain and sending a first electronic message. The first electronic message requests that a surrounding vehicle lead the autonomous vehicle until the autonomous vehicle returns to its operational design domain or reaches a predetermined location. The method also includes determining a leading vehicle and controlling the autonomous vehicle to follow the leading vehicle until the autonomous vehicle returns to its operational design domain or reaches the predetermined location.

Yet another embodiment provides a method for controlling an autonomous vehicle when the autonomous vehicle is outside of its operational design domain. The method includes detecting, with an electronic processor, that an autonomous vehicle is outside of its operational design domain and sending a first electronic message. The first electronic message requests that a surrounding vehicle lead the autonomous vehicle until the autonomous vehicle returns to its operational design domain or reaches a predetermined location. The method also includes receiving one or more control signals, a trajectory, or both from a leading vehicle and controlling the autonomous vehicle based on the one or more received control signals, the received trajectory or both until the autonomous vehicle returns to its operational design domain or reaches the predetermined location.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

Figure 1:
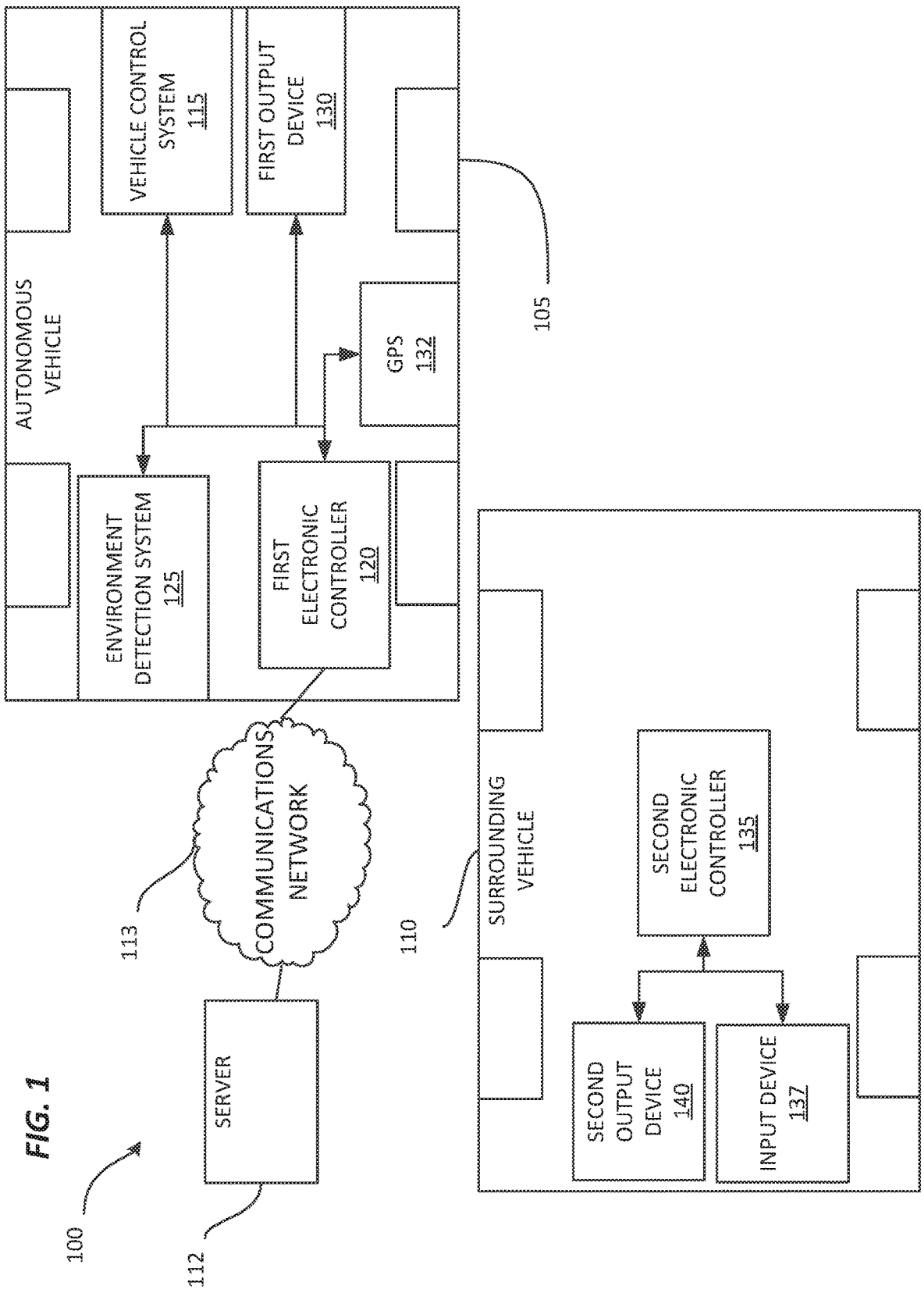
FIG. 1 is a block diagram of a system, according to one embodiment, for controlling an autonomous vehicle when the autonomous vehicle is outside of its operational design domain.

FIG. 1 illustrates a system 100 for controlling an autonomous vehicle when the autonomous vehicle is outside of its operational design domain. In the example provided, the system 100 includes an autonomous vehicle 105, a surrounding vehicle 110, and a server 112. The autonomous vehicle 105 and the surrounding vehicle 110, although illustrated as a four-wheeled vehicles, may encompass various types and designs of vehicles. For example, the autonomous vehicle 105 and the surrounding vehicle 110 may be automobiles, motorcycles, trucks, buses, a semi-tractors, a combination of the foregoing, or the like. It should be understood that the system 100 may include fewer or additional components than illustrated herein. For example, in some embodiments the system 100 does not include the server 112.

The autonomous vehicle 105 and the server 112 are communicatively coupled via a communications network 113. The communications network 113 may be implemented using a wide area network (for example, the Internet), a local area network (for example, an Ethernet or Wi-Fi™ network), a cellular data network (for example, a Long Term Evolution (LTE™) network), and combinations or derivatives thereof. In some embodiments, the autonomous vehicle 105 and the server 112 communicate through one or more intermediary devices, such as routers, gateways, or the like (not illustrated).

In the example illustrated, the autonomous vehicle 105 includes several hardware components including a vehicle control system 115, a first electronic controller 120, an environment detection system 125, a first output device 130, and a global positioning system (GPS) 132. The first electronic controller 120 may be communicatively connected to the vehicle control system 115, environment detection system 125, first output device 130, GPS 132 via various wired or wireless connections. For example, in some embodiments, the first electronic controller 120 is directly coupled via a dedicated wire to each of the above-listed components of the autonomous vehicle 105. In other embodiments, the first electronic controller 120 is communicatively coupled to one or more of the components via a shared communication link such as a vehicle communication bus (for example, a controller area network (CAN) bus) or a wireless connection. It should be understood that each of the components of the autonomous vehicle 105 may communicate with the first electronic controller 120 using various communication protocols. The embodiment illustrated in FIG. 1 provides but one example of the components and connections of the autonomous vehicle 105. Thus, the components and connections of the autonomous vehicle 105 may be constructed in other ways than those illustrated and described herein. It should also be understood that the autonomous vehicle 105 may include fewer or additional components than those illustrated in FIG. 1. For example, the autonomous vehicle 105 may not include the first output device 130.

In the example illustrated, the surrounding vehicle 110 also includes several hardware components including a second electronic controller 135, an input device 137, and a second output device 140. The second output device 140 may be, for example, a speaker or a display device (for example, a touchscreen, a liquid crystal display ("LCD"), a light-emitting diode ("LED") display, an organic LED ("OLED") display, an electroluminescent display ("ELD"), and the like). The input device 137 may be, for example, one or more buttons (for example, buttons on a steering wheel of the autonomous vehicle 105), a touchscreen (for example, as part of the display device), a microphone, a camera, or the like. The second electronic controller 135 may be communicatively connected to one or more of the components via various wired or wireless connections. For example, in some embodiments, the second electronic controller 135 is directly coupled via a dedicated wire to each of the above-listed components of the surrounding vehicle 110. In other embodiments, the second electronic controller 135 is communicatively coupled to each of the above-listed components of the surrounding vehicle 110 via a shared communication link such as a vehicle communication bus (for example, a controller area network (CAN) bus) or a wireless connection. It should be understood each of the above-listed components of the surrounding vehicle 110 may communicate with the second electronic controller 135 using various communication protocols. The embodiment illustrated in FIG. 1 provides but one example of the components and connections of the surrounding vehicle 110. Thus, the components and connections of the surrounding vehicle 110 may be constructed in other ways than those illustrated and described herein. It should also be understood that the surrounding vehicle 110 may include fewer or additional components than those illustrated in FIG. 1.

In the embodiment illustrated in FIG. 1, the server 112 includes one or more databases or is able to access one or more remote databases via the communications network 113. The one or more databases include map data. For example, the map data may include current weather data for one or more locations and construction data for one or more roadways.

Figure 2:
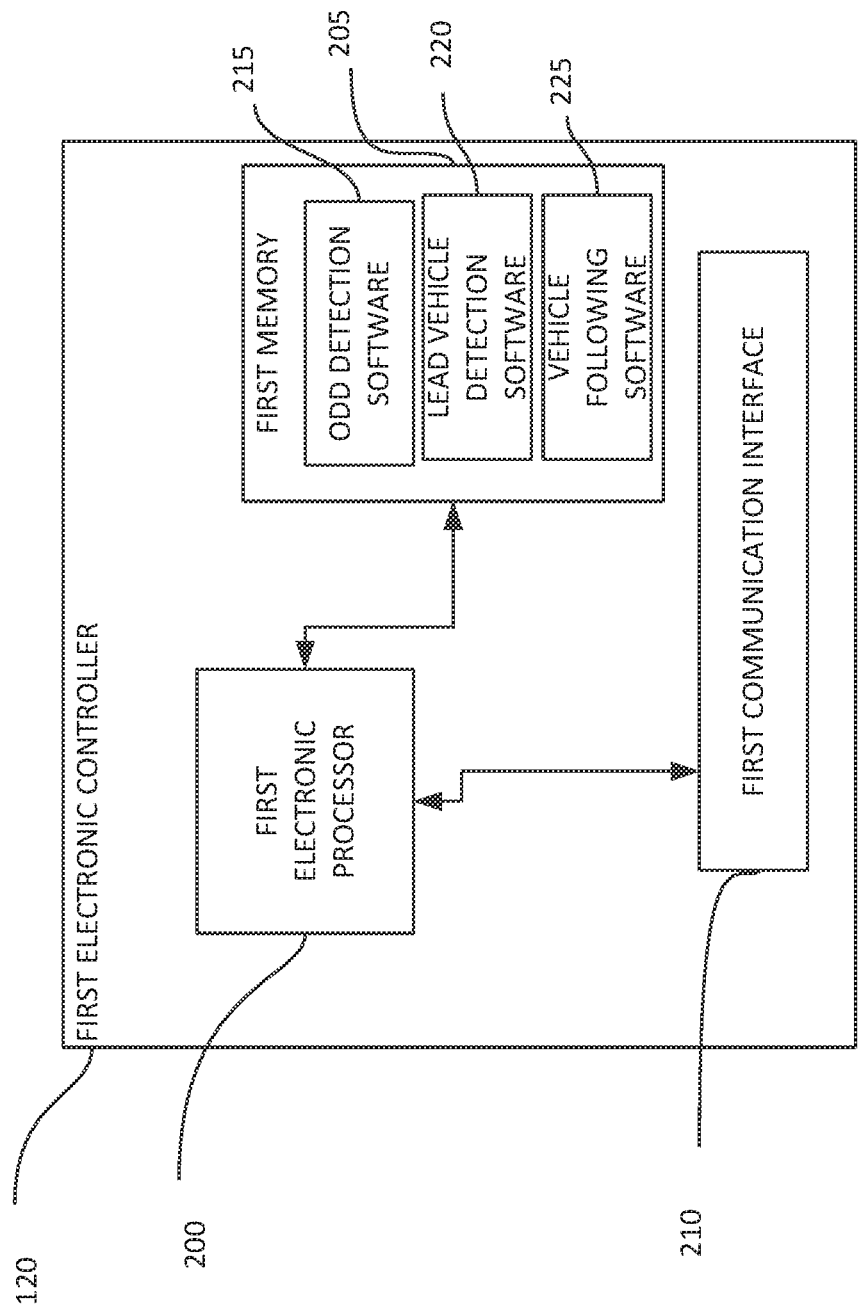
FIG. 2 is a block diagram of a first electronic controller of the system of FIG. 1 according to one embodiment.

FIG. 2 is a block diagram of one example embodiment of the first electronic controller 120 included in the autonomous vehicle 105 of FIG. 1. The first electronic controller 120 includes a plurality of electrical and electronic components that provide power, operation control, and protection to the components and modules within the first electronic controller 120. The first electronic controller 120 includes, among other things, a first electronic processor 200 (such as a programmable electronic microprocessor, microcontroller, or similar device), a first memory 205 (for example, non-transitory, machine readable memory), and a first communication interface 210. The first electronic processor 200 is communicatively connected to the first memory 205 and the first communication interface 210. The first electronic processor 200, in coordination with the first memory 205 and the first communication interface 210, is configured to implement, among other things, the methods described herein. The first electronic controller 120 may be implemented in several independent controllers (for example, programmable electronic controllers) each configured to perform specific functions or sub-functions. Additionally, the first electronic controller 120 may contain sub-modules that include additional electronic processors, memory, or application specific integrated circuits (ASICs) for handling communication functions, processing of signals, and application of the methods listed below. In other embodiments, the first electronic controller 120 includes additional, fewer, or different components.

Figure 6:
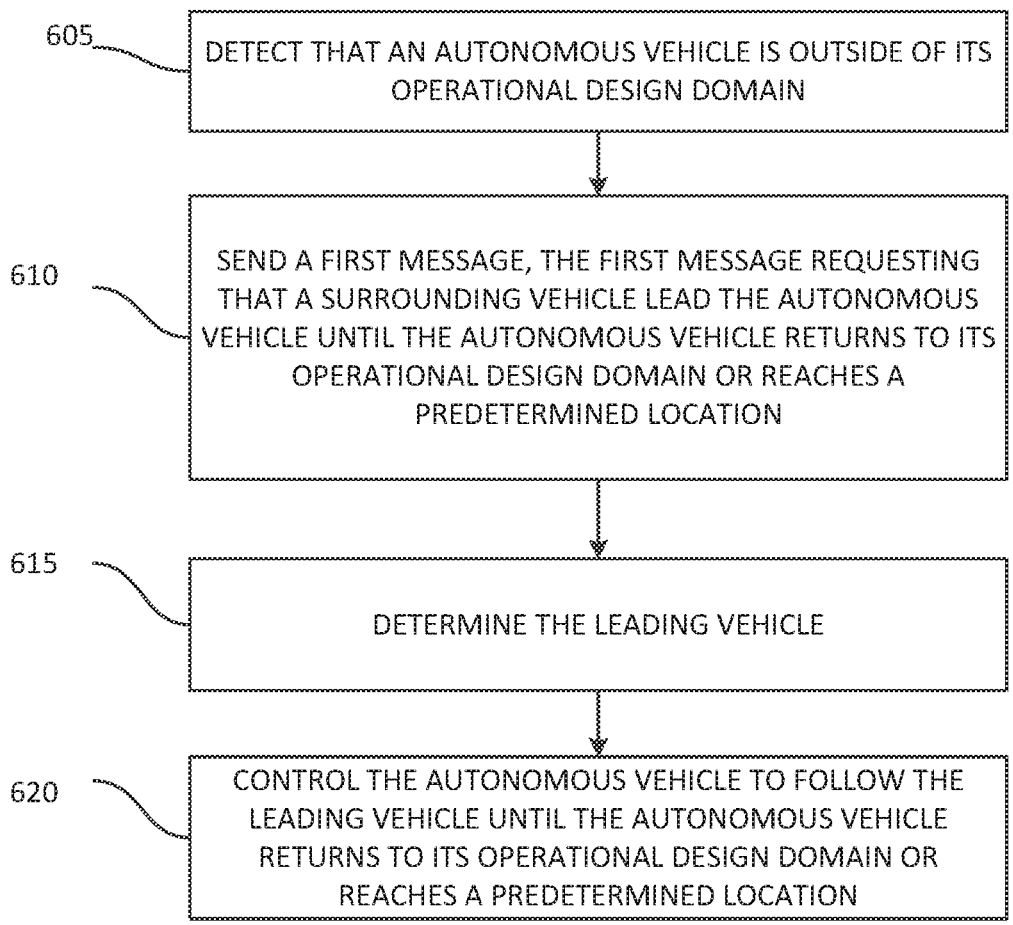
FIG. 6 is a flowchart of a method of using the system of FIG. 1 to control an autonomous vehicle when the autonomous vehicle is outside of its operational design domain according to one embodiment.

The first memory 205 of the first electronic controller 120 includes software that, when executed by the first electronic processor 200, causes the first electronic processor 200 to perform the example method 600 illustrated in FIG. 6. For example, the first memory 205 illustrated in FIG. 2 includes ODD detection software 215, lead vehicle detection software 220, and vehicle following software 225. In some embodiments, the first electronic processor 200, when executing the ODD detection software 215, determines whether the autonomous vehicle 105 is traveling within its ODD. For example, the ODD detection software 215 may include an indication of a plurality of types of surrounding environments that are outside of the ODD of the autonomous vehicle 105, one or more predetermined confidence thresholds, or both. The ODD detection software 215 may also include vision recognition algorithms configured to detect types of surrounding environments that are outside of the ODD of the autonomous vehicle 105. In some embodiments, the first electronic processor 200, when executing the lead vehicle detection software 220, determines which surrounding vehicle has agreed to lead the autonomous vehicle 105. The lead vehicle detection software 220 may also include vision recognition algorithms configured to determine the surrounding vehicle that has agreed to lead the autonomous vehicle 105. In some embodiments, data from sensors such as radar sensors, lidar sensors, both, or the like are used in addition to or instead of images from a camera to determine a surrounding vehicle that has agreed to lead the autonomous vehicle 105, determine whether the autonomous vehicle 105 is traveling within its ODD, or both. In some embodiments, the first electronic processor 200, when executing the vehicle following software 225, tracks the leading vehicle and determines actions for the autonomous vehicle 105 to perform based on the behavior of the leading vehicle.

Figure 3:
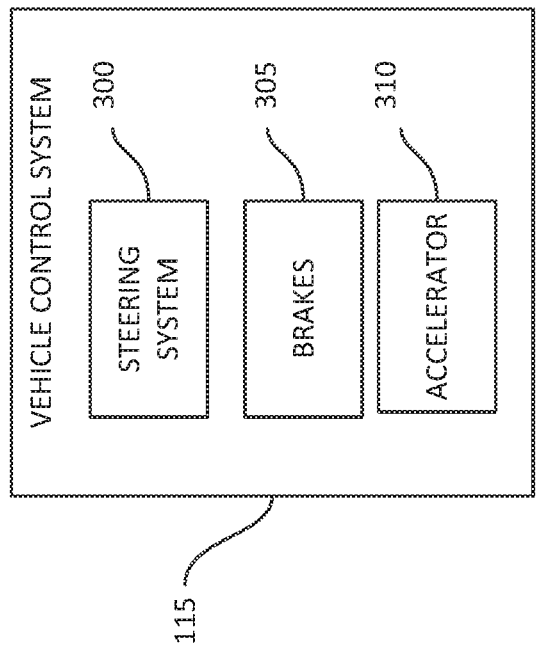
FIG. 3 is a block diagram of a vehicle control system included in the system of FIG. 1 according to one embodiment.

FIG. 3 illustrates an example of the vehicle control system 115. The vehicle control system 115 includes components involved in the autonomous or manual control of the autonomous vehicle 105. For example, in some embodiments, the vehicle control system 115 includes a steering system 300, brakes 305, and an accelerator 310. The embodiment illustrated in FIG. 3 provides but one example of the components of the vehicle control system 115. In other embodiments, the vehicle control system 115 includes additional, fewer, or different components.

Figure 4:
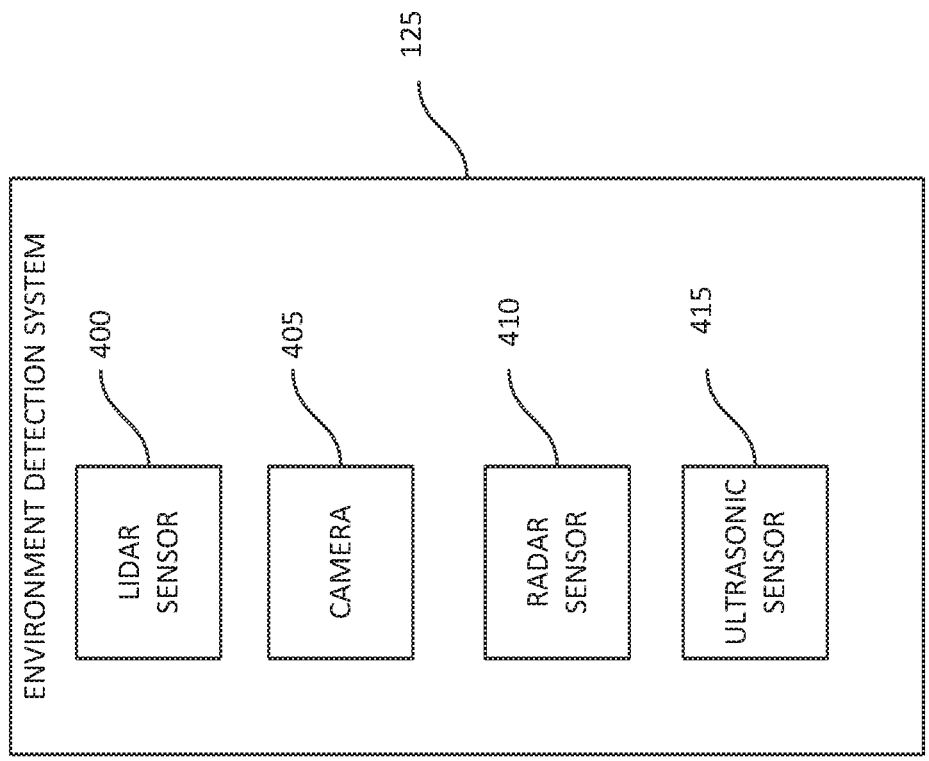
FIG. 4 is a block diagram of an environment detection system included in the system of FIG. 1 according to one embodiment.

FIG. 4 is a block diagram of the environment detection system 125 of the autonomous vehicle 105. Among other things, the environment detection system 125 includes one or more electromagnetic radiation sensors. Examples of such sensors include a lidar sensor 400, a camera 405, and a radar sensor 410. The environment detection system 125 may also include a mechanical wave sensor, for example, an ultrasonic sensor 415 in addition to the electromagnetic radiation sensors. In one embodiment, the surrounding environment of the autonomous vehicle 105 is detected using only one sensor, for example, the camera 405. In other embodiments, the environment detection system 125 uses multiple sensors, such as the lidar sensor 400, radar sensor 410, or ultrasonic sensor 415, in combination with the camera 405. There may be more than one of each of the sensors and they may be located at different positions on the interior or exterior of the autonomous vehicle 105. For example, the camera 405, or components thereof, may be externally mounted to a portion of the autonomous vehicle 105 (such as on a side mirror or a trunk door). Alternatively the camera 405, or components thereof, may be internally mounted within the autonomous vehicle 105 (for example, positioned by the rearview mirror. The sensors of the environment detection system 125 are configured to receive signals indicative of the vehicle's distance from and position relative to, elements in the autonomous vehicle's surrounding environment as the autonomous vehicle 105 moves from one point to another.

Figure 5:
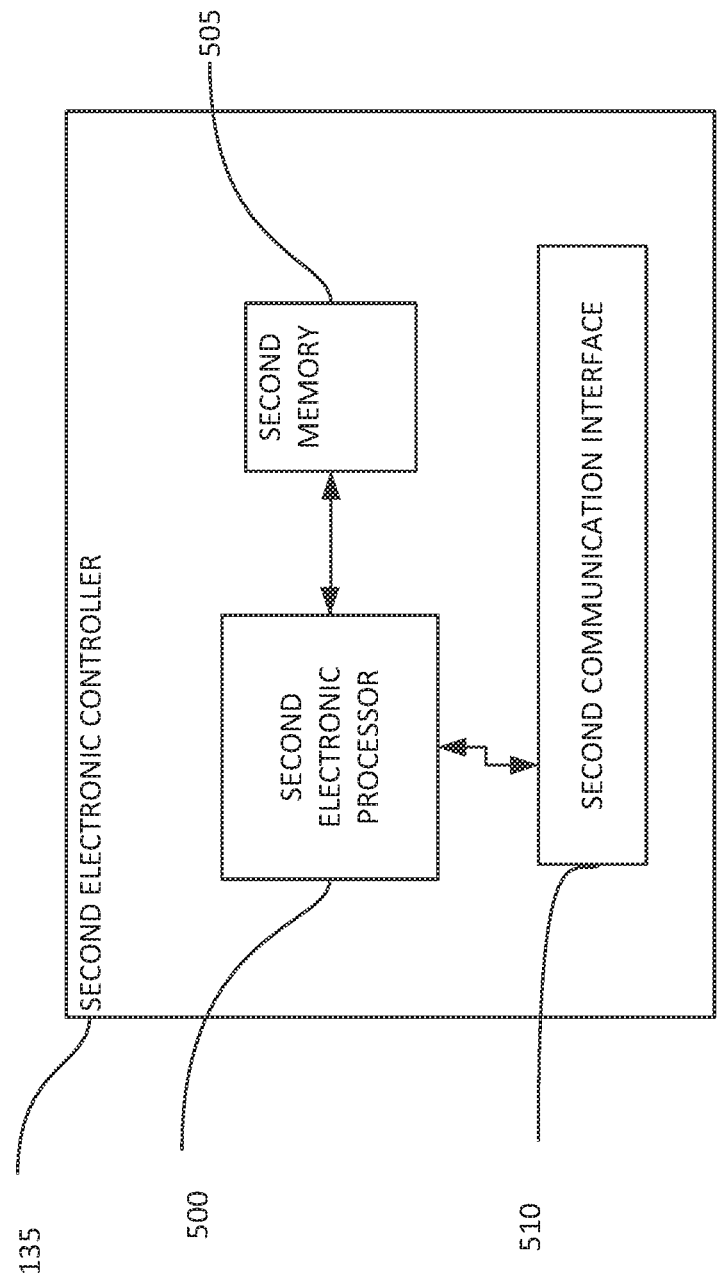
FIG. 5 is a block diagram of a second electronic controller of the system of FIG. 1 according to one embodiment.

FIG. 5 is a block diagram of one example embodiment of the second electronic controller 135 included in the surrounding vehicle 110 of FIG. 1. The second electronic controller 135 includes a plurality of electrical and electronic components that provide power, operation control, and protection to the components and modules within the second electronic controller 135. The second electronic controller 135 includes, among other things, a second electronic processor 500 (such as a programmable electronic microprocessor, microcontroller, or similar device), a second memory 505 (for example, non-transitory, machine readable memory), and a second communication interface 510. The second electronic processor 500 is communicatively connected to the second memory 505 and the second communication interface 510. The second electronic processor 500, in coordination with the second memory 505 and the second communication interface 510, is configured to implement, among other things, the methods described herein. The second electronic controller 135 may be implemented in several independent controllers (for example, programmable electronic controllers) each configured to perform specific functions or sub-functions. Additionally, the second electronic controller 135 may contain sub-modules that include additional electronic processors, memory, or application specific integrated circuits (ASICs) for handling communication functions, processing of signals, and application of the methods listed below. In other embodiments, the second electronic controller 135 includes additional, fewer, or different components.

Figure 7:
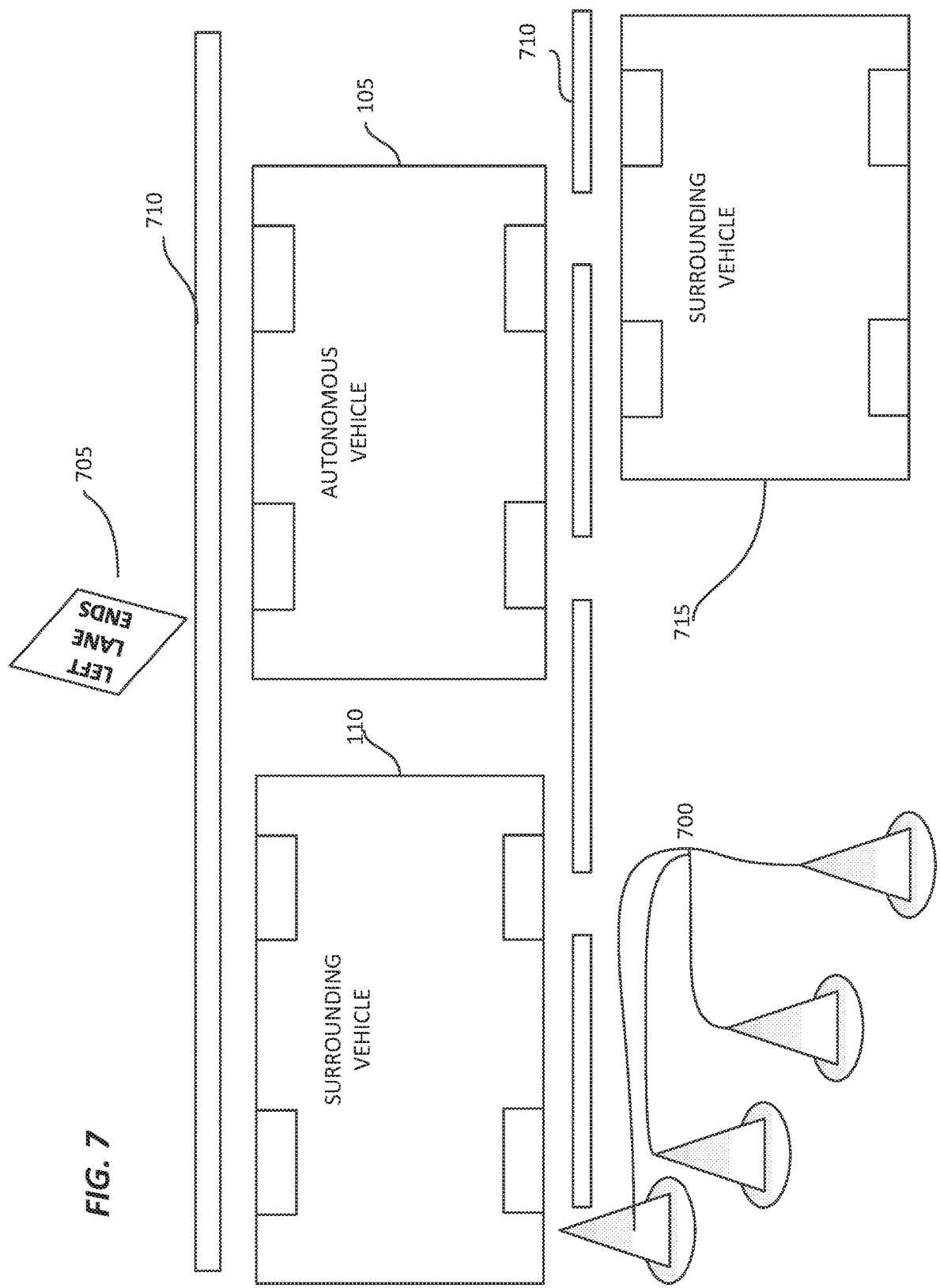
FIG. 7 is an illustration of an example situation in which the method illustrated in FIG. 6 may be performed according to one embodiment.

FIG. 6 illustrates an example of a method 600 for controlling an autonomous vehicle when the autonomous vehicle is outside of its operational design domain. At step 605, the first electronic processor 200, when executing the ODD detection software 215, detects that the autonomous vehicle 105 is outside of its ODD. In some embodiments, the first electronic processor 200 determines a type of surrounding environment that the autonomous vehicle 105 is in, in order to determine whether the autonomous vehicle 105 is outside of its ODD. For example, in the example situation illustrated in FIG. 7, the camera 405 of autonomous vehicle 105 may capture an image that includes one or more traffic cones 700 and a construction sign 705. Using the image captured by the camera 405, the first electronic processor 200 may determine that the autonomous vehicle 105 is entering a construction zone and, therefore, about to leave its ODD. For example, the first electronic processor 200 may utilize a computer vision algorithm such as a convolutional neural network (CNN) to recognize the one or more traffic cones 700 and construction sign 705. Based on the one or more traffic cones 700 and the construction sign 705 included in the surrounding environment, the first electronic processor 200 may determine that the autonomous vehicle 105 is entering a construction zone and a construction zone may be defined as a type of surrounding environment outside of the ODD of the autonomous vehicle 105. In some embodiments, the first electronic processor 200 calculates a confidence level to determine whether the autonomous vehicle 105 is outside of its ODD. For example, the first electronic processor 200 may use the data received from one or more of the sensors included in the environment detection system 125 to calculate a confidence level for the surrounding environment of the autonomous vehicle 105. For example, if the first electronic processor 200 cannot determine location or presence of road lines 710 with confidence (for example, above 75 percent certainty that the location of the road lines 710 determined by the first electronic processor 200 is the correct location of the road lines 710), the first electronic processor 200 may assign a low confidence level to the surrounding environment of the autonomous vehicle 105. If the calculated confidence level for the surrounding environment of the autonomous vehicle 105 is below the predetermined level of confidence associated with the ODD of the autonomous vehicle 105, the first electronic processor 200 determines that the autonomous vehicle 105 is outside of its ODD. In other embodiments, the first electronic processor 200 is configured to determine whether the autonomous vehicle 105 is outside of its ODD using a geographical location of the autonomous vehicle 105 and map data associated with the geographical location. For example, the first electronic processor 200 may send a request for map data associated with the location of the autonomous vehicle 105 to the server 112 along with the current location of the autonomous vehicle 105 captured by the GPS 132. The server 112 may retrieve map data associated with the current location of the autonomous vehicle 105 by performing a lookup in one or more databases. The server 112 returns, to the first electronic processor 200, the retrieved map data (for example, the current weather associated with the current location of the autonomous vehicle 105 and an indication as to whether the autonomous vehicle 105 is in or approaching a construction zone, a traffic accident, or the like). In some embodiments, the server 112, rather than the first electronic processor 200, determines whether the autonomous vehicle 105 is outside of its ODD. For example, the server 112 may receive a location associated with the autonomous vehicle 105 and based on data associated with the location (for example, weather data, environmental light, a presence of emergency vehicles, a combination of the foregoing, or the like), the server 112 may determine whether the autonomous vehicle 105 is outside of its ODD. It should be understood that the one or more methods of determining that the autonomous vehicle 105 is outside of its ODD may be used alone or in combination.

At step 610, the first electronic processor 200 sends, via the first communication interface 210 a first electronic message to one or more vehicles surrounding the autonomous vehicle 105. In some embodiments, the one or more surrounding vehicles are determined, by the first electronic processor 200, to be vehicles within a field of vision of one or more cameras mounted on or within the autonomous vehicle 105, vehicles within transmission range of a communication network (for example, vehicle to vehicle communication network with a range of 300 meters from the autonomous vehicle 105, a Bluetooth™ network with a range of 100 meters from the autonomous vehicle 105, or the like), a combination of the foregoing, or the like. In some embodiments, the server 112 determines one or more vehicles surrounding the autonomous vehicle 105. For example, the server 112 may receive the locations of a plurality of vehicles including the autonomous vehicle 105 and determine the surrounding vehicles to be vehicles with received locations within a thousand feet of the received location of the autonomous vehicle 105. The first electronic message may be sent via short-range wireless networks, such as a Bluetooth™ network, vehicle to vehicle communication network, or the like. The first electronic message requests that a surrounding vehicle of one or more surrounding vehicles lead the autonomous vehicle 105 until the autonomous vehicle 105 returns to its ODD or reaches a predetermined location. The predetermined location may be included in the first electronic message and may be an address, an exit ramp, an entrance ramp, an intersection, geographical coordinates, or the like. In the example, illustrated in FIG. 7 the first electronic message may be received by the surrounding vehicle 110 and a surrounding vehicle 715. The first electronic message may be presented to a driver of the surrounding vehicle 110 via the second output device 140. For example, the first electronic message may be output via a speaker as "Would you lead the red mini-van with the license plate number XYZ-123 to the intersection of $1^{st}$ Street and Main Street?" In some embodiments, the driver of the surrounding vehicle 110 may accept or decline to lead the autonomous vehicle 105 via the input device 137. In some embodiments, a financial reward may be offered for leading the autonomous vehicle 105. When a driver of the surrounding vehicle 110 agrees to lead the autonomous vehicle 105, then the first electronic processor 200 receives a second electronic message from the surrounding vehicle 110 accepting role of leading vehicle.

In some embodiments, the leading vehicle positions itself in front of the autonomous vehicle 105 and travels in front of the autonomous vehicle 105 in order to lead the autonomous vehicle 105. The autonomous vehicle 105 may identify and follow the surrounding vehicles in a number of ways. In one example, at step 615, the first electronic processor 200 determines or identifies the leading vehicle. In other words, the first electronic processor 200 determines which vehicle in the field of vision of the autonomous vehicle 105 has agreed to lead the autonomous vehicle 105.

In some embodiments, the first electronic processor 200 uses computer vision algorithms to detect a visual signal from a vehicle directly in front of the autonomous vehicle 105. For example, the first electronic processor 200 may detect a hand gesture made by the driver of the vehicle directly in front of the autonomous vehicle 105, a signal produced by lights (for example, tail lights) of the vehicle directly in front of the autonomous vehicle 105 (for example, flashing hazard lights), or the like. In some embodiments, the first electronic processor 200 determines the leading vehicle by detecting a license plate number on a vehicle matching a license plate number included in the second electronic message. In some embodiments, the first electronic processor 200 may determine the leading vehicle to be a vehicle that performs an unusual maneuver (for example, crossing multiple lanes of traffic) to position itself directly in front of the autonomous vehicle 105. It should be understood that the one or more methods of determining the leading vehicle may be used alone or in combination.

At step 620, the first electronic processor 200 controls the autonomous vehicle 105 to follow the leading vehicle until the autonomous vehicle 105 returns to its operational design domain or reaches a predetermined location. For example, the first electronic processor 200 uses the environment detection system 125 to track the movement and actions of the leading vehicle and uses the vehicle control system 115 to control the autonomous vehicle 105 based on the movement of the leading vehicle. For example, if the leading vehicle slows to 55 miles per hour, the first electronic processor 200 will activate the brakes 305 to slow the autonomous vehicle 105 to 55 miles per hour. In another example, if the leading vehicle turns on its right turn signal and merges into the right lane, the first electronic processor 200 activates the right turn signal of the autonomous vehicle 105 and merges the autonomous vehicle 105 into the right lane. Once the autonomous vehicle 105 reaches the predetermined location or returns to its ODD, the autonomous vehicle 105 ceases to follow the leading vehicle. In some embodiments, the autonomous vehicle 105 may send an electronic message to the leading vehicle indicating that it will no longer follow the leading vehicle.

In some embodiments, a surrounding vehicle may lead the autonomous vehicle 105 without positioning itself in front of the autonomous vehicle 105. For example, a leading vehicle may send, to the first electronic processor 200 of the autonomous vehicle 105, a trajectory, one or more control signals, or both. The trajectory, one or more control signals, or both may be sent via short-range wireless networks, such as a Bluetooth™ network, vehicle to vehicle communication network, or the like. In some embodiments, the leading vehicle may periodically send an updated trajectory, one or more control signals, or both to the autonomous vehicle 105. The first electronic processor 200 controls the autonomous vehicle 105 based on the trajectory, one or more control signals, or both received from the leading vehicle until the autonomous vehicle 105 returns to its operational design domain or reaches a predetermined location. The trajectory, control signals, or both may be determined by an electronic processor of the leading vehicle (for example, the second electronic processor 500 of the surrounding vehicle 110) based on the movement and position of the autonomous vehicle 105.

The second electronic processor 500 may determine the movement and position of the autonomous vehicle 105 using data received from the environment detection system 125 of the autonomous vehicle 105, data received from an environment detection system (not illustrated) of the surrounding vehicle 110, or both. The environment detection system of the surrounding vehicle 110, similar to the environment detection system 125, may include a camera, lidar sensor, radar sensor, ultrasonic sensor, a combination of the foregoing, or the like.

In some embodiments, the second electronic processor 500 determines or identifies the autonomous vehicle 105. In other words, the second electronic processor 500 determines which vehicle in the field of vision of the leading vehicle is the autonomous vehicle 105. In some embodiments, the second electronic processor 500 uses computer vision algorithms to detect a visual signal from a vehicle and determine the vehicle to be the autonomous vehicle 105. For example, the second electronic processor 500 may detect a hand gesture made by the driver of the vehicle, a signal produced by lights of the vehicle (for example, flashing hazard lights), or the like. In some embodiments, the first electronic processor 200 determines the autonomous vehicle 105 by detecting a license plate number on a vehicle matching a license plate number included in the first electronic message. In some embodiments, the first electronic processor 200 may determine the autonomous vehicle 105 to be a vehicle that performs an unusual maneuver, such as abruptly slowing or stopping. It should be understood that the one or more methods of determining the autonomous vehicle 105 may be used alone or in combination.

In some embodiments, the first electronic processor 200 may be configured to slow or stop the autonomous vehicle 105, when the autonomous vehicle 105 travels outside of its ODD. For example, the first electronic processor 200 may be configured to slow down or stop until a surrounding vehicle positions itself directly in front of the autonomous vehicle 105 and the autonomous vehicle 105 detects that the surrounding vehicle 110 agrees to lead the autonomous vehicle 105. When the autonomous vehicle 105 is outside of its ODD, the first electronic processor 200 may be configured to perform one or more actions to warn vehicles surrounding the autonomous vehicle 105 that the autonomous vehicle 105 may behave in an unusual manner (for example, unexpectedly slowing or stopping). In one example, the first electronic processor 200 may send an electronic message to vehicles surrounding the autonomous vehicle 105 and the surrounding vehicles may output the electronic message to their drivers via output devices such as the second output device 140. The electronic message may state, for example, "Sorry, nearby autonomous vehicle has to drive slower," "Please overtake," "Student Driver, please be patient," or the like. In another example, the first electronic processor 200 may utilize the first output device 130 to signal vehicles surrounding the autonomous vehicle 105 to be cautious around the autonomous vehicle 105. For example, the first output device 130 may be one or more lights. A red light may indicate that the autonomous vehicle 105 is outside of its ODD and a green light may indicate that the autonomous vehicle 105 is within its ODD. The first output device 130 may also be one or more lights with a function in addition to alerting surrounding vehicles that the autonomous vehicle 105 is outside of its ODD. For example, the first output device 130 may be the tail lights, headlights, turning lights, a combination of the foregoing, or the like. In one example the first electronic processor 200 may be configured to flash the tail lights and headlights of the autonomous vehicle 105 every five seconds while the autonomous vehicle 105 is outside of its ODD. It should be understood that the one or more methods of warning vehicles surrounding the autonomous vehicle 105 that the autonomous vehicle 105 is outside of its ODD and may behave in unexpected ways may be used alone or in combination.

In some embodiments, rather than or in addition to communicating directly with autonomous vehicles as described above, the first electronic processor 200 may send electronic messages to infrastructure in the surrounding environment of the autonomous vehicle 105. For example, the first electronic processor 200 may send the first electronic message to an electronic road sign and the electronic road sign may display the request for a leading vehicle and an indication of the autonomous vehicle 105. The request for the leading vehicle may be removed from display on the electronic road sign when the electronic road sign receives an electronic message from the leading vehicle or the autonomous vehicle 105 that the autonomous vehicle 105 is being led or after a predetermined amount of time has elapsed. In some embodiments, the first electronic processor 200 sends an electronic message to an electronic road sign requesting the road sign display an electronic message warning surrounding vehicles that the autonomous vehicle 105 is outside of its ODD and may behave in an unusual manner. In some embodiments, the warning is removed from the road sign after a predetermined amount of time has elapsed.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

What is claimed is:

1. A system for controlling an autonomous vehicle when the autonomous vehicle is outside of its operational design domain, the system comprising:
    an environment detection system for determining environmental conditions that include fog condition or snowing condition;
    a vehicle control system; and
    an electronic processor disposed in the autonomous vehicle, the electronic processor configured to
        detect that the autonomous vehicle is outside of the operational design domain when at least one from a group consisting of: a construction zone having barricades and/or temporary signage, the fog condition, and the snowing condition, is determined;
        send a first electronic message to surrounding vehicles surrounding the autonomous vehicle, the first electronic message requesting that one of the surrounding vehicles lead the autonomous vehicle until the autonomous vehicle returns to the operational design domain or reaches a predetermined location;
        determine a leading vehicle of the surrounding vehicles; and
        control the autonomous vehicle to follow the leading vehicle until the autonomous vehicle returns to the operational design domain or reaches the predetermined location.

2. The system according to claim 1, wherein the electronic processor is configured so the detecting that the autonomous vehicle is outside the operational design domain includes using a geographical location of the autonomous vehicle and a map data associated with the geographical location.

3. The system according to claim 1, wherein the electronic processor is configured so the detecting that the autonomous vehicle is outside the operational design domain is provided by
    calculating, using the environment detection system, a confidence level associated with a surrounding environment of the autonomous vehicle; and
    when the confidence level is below a predetermined level of confidence, determining the autonomous vehicle is outside of the operational design domain.

4. The system according to claim 1, wherein the operational design domain is one or more parameters that the electronic processor is trained to operate the autonomous vehicle within with a predetermined level of confidence.

5. The system according to claim 1, wherein the electronic processor is configured to determine the leading vehicle by determining a surrounding vehicle that performs an unusual maneuver while moving directly in front of the autonomous vehicle.

6. The system according to claim 1, wherein the electronic processor is configured to determine the leading vehicle by
    receiving a second electronic message from one of the surrounding vehicles accepting a role of the leading vehicle, wherein the second electronic message includes a license plate number of the leading vehicle; and
    matching the license plate number included in the second electronic message with the leading vehicle.

7. The system according to claim 1, wherein the electronic processor is configured to determine the leading vehicle by
    detecting a visual signal produced by the surrounding vehicle or a driver of a surrounding vehicle in front of the autonomous vehicle.

8. The system according to claim 1, wherein the predetermined location is included in the first electronic message, and wherein the first electronic message to the surrounding vehicles is sent via a short range wireless network.

9. The system according to claim 1, wherein the electronic processor is further configured to slow or stop the autonomous vehicle until the leading vehicle is determined.

10. The system according to claim 9, wherein the electronic processor is further configured to warn the surrounding vehicles surrounding the autonomous vehicle that the autonomous vehicle is stopping or slowing via a short-range wireless network.

11. The system according to claim 10, wherein the electronic processor is further configured to warn the surrounding vehicles surrounding the autonomous vehicle by sending a message via a vehicle to vehicle communication network to be output by an output device of each of the surrounding vehicles.

12. A method for controlling an autonomous vehicle when the autonomous vehicle is outside of its operational design domain, the method comprising:
    detecting, with an electronic processor disposed in the autonomous vehicle, that the autonomous vehicle is outside of the operational design domain when at least one from a group consisting of: presence of a construction zone having barricades and/or temporary signage; a fog condition; and a snowing condition, is determined;
    sending, with the electronic processor, a first electronic message to surrounding vehicles surrounding the autonomous vehicle, the first electronic message requesting that one of the surrounding vehicles lead the autonomous vehicle until the autonomous vehicle returns to the operational design domain or reaches a predetermined location;
    determining a leading vehicle from the surrounding vehicles; and
    controlling the autonomous vehicle to follow the leading vehicle until the autonomous vehicle returns to the operational design domain or reaches the predetermined location.

13. The method according to claim 12, wherein the operational design domain is one or more parameters that the electronic processor is trained to operate the autonomous vehicle within with a predetermined level of confidence.

14. The method according to claim 12, wherein the determining of the leading vehicle includes determining a surrounding vehicle that performs an unusual maneuver while moving directly in front of the autonomous vehicle.

15. The method according to claim 12, the method further comprising determining the lead vehicle by
    receiving a second electronic message from one of the surrounding vehicles accepting a role of the leading vehicle, wherein the second electronic message includes a license plate number of the leading vehicle; and
    matching the one of the surrounding vehicles with a license plate number matching the license plate number included in the second electronic message.

16. The method according to claim 12, wherein the determining of the leading vehicle includes
    detecting a visual signal produced by the surrounding vehicle or a driver of a surrounding vehicle located in front of the autonomous vehicle.

17. The method according to claim 12, the method further comprising slowing or stopping the autonomous vehicle until the leading vehicle is determined.

18. The method according to claim 17, the method further comprising warning the surrounding vehicles surrounding the autonomous vehicle that the autonomous vehicle is stopping or slowing via a vehicle to vehicle communication network.

19. A method for controlling an autonomous vehicle when the autonomous vehicle is outside of its operational design domain, the method comprising:
    detecting, with an electronic processor disposed in the autonomous vehicle, that the autonomous vehicle is outside of the operational design domain when at least one from a group consisting of: presence of a construction zone having barricades and/or temporary signage; a fog condition; and a snowing condition, is determined;
    sending a first electronic message from the autonomous vehicle to surrounding vehicles via a vehicle to vehicle communication network, the first electronic message requesting that one of the surrounding vehicles lead the autonomous vehicle until the autonomous vehicle returns to the operational design domain or reaches a predetermined location;
    receiving one or more control signals, a trajectory, or both from the surrounding vehicle that becomes the leading vehicle; and
    controlling the autonomous vehicle based on the one or more received control signals, the received trajectory or both until the autonomous vehicle returns to the operational design domain or reaches the predetermined location.

20. The method according to claim 19, further including:
    receiving a second electronic message from one of the surrounding vehicles accepting a role of the leading vehicle, wherein the second electronic message includes a license plate number of the leading vehicle; and
    matching the license plate number included in the second electronic message with the leading vehicle.

* * * * *